United States Patent [19]

Weissman et al.

[11] Patent Number: 5,389,592
[45] Date of Patent: Feb. 14, 1995

[54] METHOD OF ENHANCING THE ACTIVITY OF REGENERATED CATALYSTS

[75] Inventors: Jeffrey G. Weissman, Wappingers Falls; Elaine C. Decanio, Montgomery; Max R. Cesar, New Burgh, all of N.Y.

[73] Assignee: Texaco Inc., White Plains, N.Y.

[21] Appl. No.: 136,145

[22] Filed: Oct. 15, 1993

[51] Int. Cl.$^6$ .................. B01J 23/94; B01J 23/92; B01J 38/64; B01J 38/66
[52] U.S. Cl. .................. 502/25; 208/216 R; 208/254 H; 502/22; 502/26; 502/27; 502/33; 502/521
[58] Field of Search .................. 502/22, 25, 26, 27, 502/28, 206, 516, 521, 33

[56] References Cited

U.S. PATENT DOCUMENTS

| 2,878,180 | 3/1959 | Watkins | 502/206 |
| 4,080,286 | 3/1978 | Yanik et al. | 502/206 |
| 4,795,726 | 1/1989 | Schaper et al. | 502/26 |
| 5,232,885 | 8/1993 | Clark et al. | 502/521 |
| 5,275,990 | 1/1994 | Clark et al. | 502/521 |

FOREIGN PATENT DOCUMENTS

| 738660 | 6/1980 | U.S.S.R. | 502/25 |

Primary Examiner—Paul E. Konopka
Attorney, Agent, or Firm—Kenneth R. Priem; Vincent A. Mallare; Cynthia L. Kendrick

[57] ABSTRACT

A method of enhancing the activity of a regenerated catalyst for the hydroprocessing of hydrocarbons comprising:

(a) applying a modifying element dissolved in a solvent onto the surface of a regenerated catalyst;
(b) drying said modified regenerated catalyst to remove all free solvent from said catalyst;
(c) optionally, heating said dried modified regenerated catalyst at temperature of about 120° C. to about 1000° C. at a rate of 1°–20° C. per minute, and holding said dried catalyst at a temperature of about 120° C. to about 1000° C. up to 48 hours to provide an enhanced regenerated catalyst; and
(d) recovering said enhanced regenerated catalyst.

6 Claims, No Drawings

METHOD OF ENHANCING THE ACTIVITY OF REGENERATED CATALYSTS

BACKGROUND OF THE INVENTION

This invention relates to a process for improving regenerated catalysts which are suitable for reuse in the hydroprocessing of naphthas and gas oils.

Hydrocarbon fuels are now being required to be produced with extremely low sulfur content, for example less than 0.05 wt % sulfur in diesel fuel, and 500 ppm sulfur or less in gasoline. To meet these requirements refineries have to hydroprocess naphthas and gas oils at higher temperatures and under more severe conditions. In order to maintain throughput and profitability, higher activity catalysts are required for these operations. These catalysts are frequently regenerated for reuse after being employed. However, they may suffer a significant loss in activity after undergoing regeneration, as compared to a fresh catalyst.

Thus, an object of the present invention is to provide an effective, inexpensive method of enhancing the activity of regenerated catalysts.

DISCLOSURE STATEMENT

U.S. Pat. No. 5,087,596 discloses a process for regeneration of a used hydroprocessing catalyst where additional molybdenum is added during the regeneration process.

U.S. Pat. No. 5,071,538 discloses the use of rare earth metals in a catalyst regeneration process.

Both of these patents differ from the current invention in that they involve costly raw materials or additional processing steps. In addition, the current invention can be implemented before, during, or after the regeneration procedure, allowing improved flexibility in improving the catalyst performance.

SUMMARY OF THE INVENTION

This invention provides a method of enhancing the activity of a regenerated catalyst for the hydroprocessing of hydrocarbons comprising:
(a) applying a modifying element dissolved in a solvent onto the surface of a regenerated catalyst;
(b) drying said modified regenerated catalyst to remove all free solvent form said catalyst;
(c) optionally, heating said dried modified regenerated catalyst at a temperature of about 120° C. to about 1000° C. up to 48 hours to provide an enhanced regenerated catalyst; and
(d) recovering said enhanced regenerated catalyst.

DETAILED DESCRIPTION OF THE INVENTION

Generally, the present process consists of incorporating boron or a similar element or compound onto a regenerated catalyst, before, during or after the regeneration procedure, the product is found to have enhanced catalytic activity, as compared to an equivalent unmodified regenerated catalyst in the hydroprocessing of hydrocarbons.

Conventional hydroprocessing catalysts consist of several active metals, activity enhancers or other additives, and a support. As commonly practiced, the support is composed of a high surface area, high pore volume refractory oxide support, such as various aluminas; other supports commonly used or reported in prior art include silica, zeolites, titanias, and zirconias, and mixtures of these with each other or alumina, carbon has also been employed. Onto the support is dispersed an active metal, usually deposited as a metal salt, which is then normally converted to an oxide, and then to a sulfide prior to utilization. Active metals include those of Groups VIB, VIIB, and VIII or the Periodic Table; however, only Ni, Co, Mo, and W are commonly used. Other elements, acting as dispersing agents or activity enhancers, may also be employed, these include P and F. After use in a hydroprocessing operation, the used catalysts containing significant amounts of carbon; consequently, the catalysts are commonly regenerated for reuse; commonly practiced regeneration processes involve the controlled removal of carbon from the catalyst, and the at least partial oxidation of the active metals.

A used catalyst is one that has had its active metals converted to sulfides, then exposed to hydroprocessing conditions for some length of time, sufficient to cause a significant loss in activity. This activity loss can occur through deposition of coke or other hydrocarbons onto the catalyst, as well as metallic and non-metallic poisons, including silicon. After utilization, the deposited carbons are removed from the used catalyst by various means, usually involving some oxidation process. This regenerated catalysts will typically have an activity less than the corresponding fresh catalyst, due to physical changes occurring on the catalyst from the various processes it has been exposed to during use and regeneration. Deposited silicon is also known to cause an activity reduction when a used catalyst is regenerated.

Application of the method of this invention to regenerated catalyst provides a means of increasing its activity; such means would not be otherwise available. This also provides a way of utilizing a regenerated catalyst in a service requiring higher activity, in which it would otherwise not be suitable, and so provides a way of extending the usefulness of catalysts and so reducing the amount of waste catalyst generated.

The process is most effective for catalysts having a limited degree of silicon contamination. In this case, Si is introduced onto the catalyst as a result of the process or reaction causing deactivation. This is distinguished from silicon contained in the original catalyst, either as a support component or an additive; silicon intrinsic to the catalyst composition can vary unrestrictedly. Si deposited onto the catalyst should not exceed more than 3.0 weight percent. Thus, the process of this invention is less effective if the used catalyst contains more than 3.0 wt. % deposited Si.

The modifier is placed onto the regenerated catalyst using several deposition methods, including equilibrium adsorption from solutions of salts or other soluble compounds, or incipient wetness impregnation of solutions containing the compounds, or other methods, such a deposition from a vapor phase or any other method resulting in an uniform distribution of the modifier on the regenerated catalyst.

One preferred technique of adding modifier to the regenerated catalyst is incipient wetness impregnation. The required amount of modifier is dissolved in a solvent, such as water, hydrogen peroxide solution, acetone, alcohols, or other convenient solvent, the volume of solvent corresponding to the pore volume capacity of the catalyst. This solution is placed onto the catalyst, assuring that all of the solution is placed evenly throughout the catalyst volume. In the case that the volume of solvent needed to dissolve the required amount of salt exceeds the pore volume of the catalyst, multiple impregnation steps can be undertaken, with intermediate drying steps.

After deposition a drying step is necessary to remove excess solvent, followed by an optional heat treatment step. A drying step involves removing all free solvent at mild conditions, such as from 20 to 120° C. for up to 16 hours, in inert or oxygen containing atmosphere, and under vacuum or atmospheric pressure, or elevated pressures. The heat treatment step involves heating in an oxygen containing gas, such as air or a gas of specific oxygen content, at a sufficiently high temperature to remove all solvent and decompose the modifier salts. Such a step involves heating to 120 to 1000° C., at a rate of 1° to 20° C. per minute, and holding at from 120° to 1000° C. for up to 48 hours, and then cooling to room temperature, all under a flow of gas at a rate sufficient to remove reaction products arising from the decomposition of the metal salts. The composition of the gas can be modified during the heat treating step as required. This heat treating step can serve additionally as a regeneration step, in which carbon is removed in a controlled manner, as commonly practiced.

It has now been found that suitable modifying elements and compounds include those containing boron and fluorine, although other elements having compounds with similar properties can be employed, such as tin, arsenic, antimony, bismuth, chlorine, bromine, iodine, lithium, beryllium, sodium, potassium, rubidium, and cesium. However, boron and boron containing compounds are preferred. Compounds such as the hydrated acids, ammoniacal salts, halides, and nitrates of these elements can be employed, examples of which include boric acid, $H_3BO_3$, boron fluoride, $BF_3$, or fluoroboric acid, $HBF_4$, various boron fluorine hydrocarbon compounds of general formula $B_nF_mR_o$, or the oxygenated equivalents, n, m, and o being positive integers, n and o having values of at least 1, and m can be zero or greater, and where R can be a combination of hydrocarbons such as ethers, paraffins, aromatics or other ring compounds, amines, and so on, examples of which are boron fluoride-ether, $BF_3(C_2H_5)_2O$, boron tripropoxide, $B(OC_2H_2)_3$ triethylboron, $(C_2H_5)_3B$, ammonium fluoride, $NH_4F$, ammonium hexafluorophosphate, $NH_4PF_6$, antimony fluoride, $SbF_5$, and other similar compounds. We prefer boric acid and ammonium borate.

The composition of a treated regenerated catalyst prepared as described above can range from containing 0.01 to 5.0 weight percent of the modifying element on the modified catalyst. More preferred is from 0.1 to 2.0 weight percent of the modifying element.

After treatment, the improved regenerated catalyst is employed as any other catalysts, fresh or regenerated, would be employed, as commonly practiced; such is in hydroprocessing and hydrotreating operations. Other uses of the treated regenerated catalysts can be conceived, such as in hydrogenation processes, alkylation process, hydrocracking processes, resid upgrading, lube oil hydroprocessing, hydrofining, or finishing processes; in either the as-modified or sulfided states. Also it can be conceived as usable in selective hydrogenation, dehydrogenation, alkylation or amination reactions.

A regenerated catalyst treated according to this invention and employed for hydroprocessing, gives improvements over that of the untreated regenerated catalyst. We have discovered that incorporating electronegative elements or compounds, such as boron, onto regenerated catalysts results in significantly improved activity for removal of sulfur and nitrogen impurities for hydrocarbon streams during a hydroprocessing operation. Elements include boron and fluorine, and compounds containing boron and fluorine. These are introduced onto the catalyst by a simple addition step, either before, during, or after the regeneration procedure. The process has been found to be effective for used catalysts containing no more than 3.0 wt. % silicon deposited during catalyst use.

Using this process to improve catalyst activity provides a simple, quick and inexpensive method of increasing catalyst performance at a relatively low cost. The process may be applied locally, at the site of catalyst utilization, without special equipment. Additionally, this process offers a means to improve the activity of regenerated catalysts that otherwise may not be suitable for hydroprocessing operations requiring high catalytic activity. This also provides a way of extending the usefulness of catalysts and so reducing the amount of waste catalyst generated.

The preparation and use of materials of this invention are further described by the following Examples in which there is illustrated treated and untreated regenerated catalysts tested using the standard procedure set forth below.

Standard Testing Procedure

A volume of the catalyst to be tested is placed inside of a stainless steel tubular reactor. The material is sulfided in a 10 wt % mixture of $H_2S$ in $H_2$ at a rate of 9 SCCM of gas per $cm^3$ catalyst, at 300° C. and at atmospheric pressure for three hours. After completion of sulfiding, hydroprocessing is commenced under the following conditions: gas flow is switched to pure $H_2$ at 12 SCCM per $cm^3$ of catalyst, and a liquid flow of 2 ml/hr per $cm^3$ of catalyst, corresponding to 2 liquid-hourly space velocity, started, with the overall reactor pressure being held at 800 psi and operated at from 300° to 380° C. The change from sulfiding to operating conditions is conducted in such a manner as to ensure that the catalysts is always in a sulfur containing environment, either from sulfur containing gas or hydrocarbon feed. The hydrocarbon feed is representative of the type treatable by the modified catalysts of this invention, consisting of a light atmospheric gas oil (LAGO) having the properties described in Table 1.

After operating in this mode for a minimum of 18 hours, at which point steady-state operating conditions are reached, liquid products are removed for analysis for sulfur and nitrogen content, by X-ray fluorescence and pyrolysis, respectively. After samples are taken, temperature is changed as required to a different value, with a minimum of 18 hours allowed after each temperature change before sampling. Sulfur and nitrogen removal activities are calculated based on the feed and product sulfur and nitrogen contents, using the following equations, assuming first order reaction kinetics for both sulfur and nitrogen removal:

$$K_S = 2LHSV \ln\left(\frac{S_f}{S_p}\right)$$

$$K_N = 2LHSV \ln\left(\frac{N_f}{N_p}\right)$$

where $K_S$ is sulfur removal activity (1/hr), $K_N$ is nitrogen removal activity (1/hr), LHSV is liquid hourly space velocity ( cm³ liquid/cm³ catalyst/hr), $S_f$ and $S_p$ are amounts of sulfur in the feed and product (wt %), and $N_f$ and $N_p$ are amounts of nitrogen in the feed and product (ppm).

TABLE 1

Properties of Light Atmospheric Gas Oil

| | |
|---|---|
| Gravity | 32.0° |
| IBP | 386° F. |
| 10% | 506° F. |
| 50% | 571° F. |
| 90% | 651° F. |
| EP | 680° F. |
| sulfur, wt % | 0.7 |
| nitrogen, ppm | 490.0 |
| aromatics, wt % | 30.0 |

In order to illustrate the present invention and the advantages thereof, the following Examples are provided.

EXAMPLE 1

This Example describes the preparation of treated regenerated catalysts according to methods of this invention; and the results of testing the treated regenerated catalysts against the untreated regenerated catalyst.

A commercially used Ni—Mo/Al₂O₃ catalyst, having been employed in a hydroprocessing operation, was commercially regenerated, designated 'I'. After regeneration, this catalyst was found to contain about 0 5 wt. % Si.

I was treated with a boron containing solution. Boric acid, H₃BO₃ was combined with deionized water, the volume of water corresponding to the pore volume of the quantity of I treated; the solution added to I by the incipient wetness technique. The product was dried at 110° C. for three hours, and is designated 'I+BD'. Sufficient quantity of boric acid was used to give a product containing 0.33 percent by weight boron. Similarly, a quantity of boric acid solution was added to I, and the product was dried and then heat treated in flowing air at 500° C. for three hours, this product is designated 'I+BC'.

I, I+BD and I+BC were tested according to the standard procedure, at 360° C. operating temperature, and the following results obtained:

| Catalyst | $K_S$ (360° C.) | $K_N$ (360° C.) |
|---|---|---|
| I (0.5 wt. % Si) | 10.0 | 4.3 |
| I + BD | 11.7 | 5.0 |
| I + BC | 10.4 | 5.4 |

These results clearly indicate the advantage of adding boron to a regenerated catalyst, as both the sulfur and nitrogen removal activities are significantly enhanced by boron treatment.

EXAMPLE 2

This Example describes the preparation of treated regenerated catalysts according to several methods of this invention; and the results of testing the treated regenerated catalysts against the untreated regenerated catalyst.

A different commercially used Ni—Mo/Al₂O₃ catalyst, having been employed in a hydroprocessing operation, was regenerated according to the following procedure. The used catalyst was heated, in flowing nitrogen, to 200° C. in thirty minutes, and then held at 200° C. for two hours in nitrogen. The gas was switched to flowing air, and the temperature raised to 425° C. in a two hour period, and held at 425° C. in flowing air for four hours, and cooled to room temperature in flowing nitrogen. The regenerated product is designated 'II', and contains about 0.2 wt % Si after regeneration.

II was treated with a boron containing solutions as in Example 1, resulting in products II+BD and II+BC. The products contain about 0.33 wt. % boron.

Alternatively, prior to regeneration, boron was added to the used catalyst employed to make sample II. A quantity of boric acid solution was added to the used catalyst, and then the catalyst was regenerated according to the same procedure used in II. This product is designated 'B+II', and contains about 0 35 wt % boron.

II, B+II, II+BD and II+BO were tested according to the standard procedure, at 360° C. operating temperature, and the following results obtained:

| Catalyst | $K_S$ (360° C.) | $K_N$ (360° C.) |
|---|---|---|
| II (0.2 wt. % Si) | 8.5 | 4.4 |
| B + II | 11.4 | 6.2 |
| II + BD | 10.1 | 5.9 |
| II + BC | 8.9 | 3.9 |

These results clearly indicate the advantage of adding boron to a regenerated catalyst by a variety of methods, as both the sulfur and nitrogen removal activities are enhanced by boron treatment.

EXAMPLE 3

This Example illustrates the use of alternative starting materials to modify regenerated catalysts. A variety of boron containing compounds are found to be effective in improving the activity of regenerated catalysts, as compared to unmodified catalysts.

A commercially used Ni—Mo/Al₂O₃ catalyst, having been employed in a hydroprocessing operation, was commercially regenerated, designated 'III', being identical to II used in Example 2. After regeneration, this catalyst was found to contain about 0.2 wt. % Si.

Using the same procedures used in Example 1, III was modified with quantities boric acid, ammonium tetraborate, (NH₄)₂B₄₇·4H₂O, and boron tripropoxide, B(OC₃H₇)₃. 1.71 g. of H₃BO₃ was mixed with 36 g. of water and 60 g. of III, this product was dried at 110° C. and then treated in air at 500° C. for 3 hours, this product is designated '3A'. Similarly, 0.92 g. of (NH₄)₂B₄O₇·4H₂O was mixed with 11.1 g. of water and 30 g. of III, and then dried at 110° C. and then treated in air at 500° C. for 3 hours, this product is designated '3B'. Similarly, 2.61 g. of B(OC₃H₇)₃ was mixed with 3.4 g. of ethanol, this solution was added to 30 g. of III, conducted in an inert atmosphere, and then dried at 110° C. and then treated in air at 500° C. for 3 hours, this product is designated '3C'.

III, 3A, 3B, and 3C were tested according to the standard procedure, at 360° C. operating temperature, and the following results obtained:

| Catalyst | boron precursor | $K_S$ (360° C.) | $K_N$ (360° C.) |
|---|---|---|---|
| III | none | 8.5 | 4.4 |
| 3A | H₃BO₃ | 8.9 | 3.9 |

-continued

| Catalyst | boron precursor | $K_S$ (360° C.) | $K_N$ (360° C.) |
|---|---|---|---|
| 3B | $(NH_4)_2B_4O_7 \cdot 4H_2O$ | 9.0 | 4.4 |
| 3C | $B(OC_3H_7)_3$ | 9.5 | 4.9 |

We claim:

1. A method of enhancing the activity of a used silicon containing catalyst for the hydroprocessing of hydrocarbons containing active metals from Groups VIB, VIIB and VIII of the Periodic Table which has been regenerated by an oxidation process, comprising:

(a) applying a modifying amount of a soluble boron containing compound or compounds in a solvent selected from the group consisting of water, hydrogen peroxide solution, acetone and alcohol, onto the surface of a regenerated catalyst;

(b) drying said modified regenerated catalyst to remove all free solvent from said catalyst;

(c) recovering said enhanced regenerated catalyst containing from about 0.01 to about 5.0 wt. % of said boron.

2. The method of claim 1, wherein the volume of said solvent corresponds to the pore volume capacity of said finished catalyst.

3. The method of claim 1 further comprising a heating step after drying which comprises heating said dried modified regenerated catalyst at temperature of about 120° C. to about 1000° C. at a rate of 1°-20° C. per minute, and holding said dried catalyst at a temperature of about 120° C. to about 1000° C. up to 48 hours to provide an enhanced regenerated catalyst.

4. The method of claim 1 wherein the regenerated catalyst has a limited degree of silicon contamination of up to 0.3 wt. %.

5. The method of claim 1 wherein the modifying boron containing compounds are placed onto the regenerated catalyst by a method selected from equilibrium adsorption from solutions of salts or other soluble compounds or incipient wetness impregnation of solutions containing the compounds.

6. The method of claim 1 wherein the modifying soluble boron containing compound is selected from the group consisting of boric acid and ammonium borate.

* * * * *

UNITED STATES PATENT AND TRADEMARK OFFICE
CERTIFICATE OF CORRECTION

PATENT NO. : 5,389,592
DATED : February 14, 1995
INVENTOR(S) : JEFFREY GLENN WEISSMAN, ELAINE CLAIRE DECANIO and MAX RAPHAEL CESAR It is certified that error appears in the above-indentified patent and that said Letters Patent is hereby corrected as shown below:

Column 7, line 10,
In Claim 1, line 2, before "catalyst" delete "containing"

and substitute therefor --contaminated--.

Signed and Sealed this

Sixteenth Day of May, 1995

Attest:

BRUCE LEHMAN

*Attesting Officer*   *Commissioner of Patents and Trademarks*